United States Patent [19]

Ichbiah

[11] Patent Number: 5,623,406
[45] Date of Patent: Apr. 22, 1997

[54] METHOD AND SYSTEM FOR ENTERING TEXT IN COMPUTER EQUIPMENT

[75] Inventor: Jean D. Ichbiah, 58 Lexington St., Essex, Mass. 01803

[73] Assignee: Jean D. Ichbiah, Burlington, Mass.

[21] Appl. No.: 398,897

[22] Filed: Mar. 6, 1995

[51] Int. Cl.⁶ .................................................. G06F 15/00
[52] U.S. Cl. ............................................................ 395/753
[58] Field of Search ........................ 364/419.15, 419.07, 364/419.19; 395/145, 148; 345/25, 26

[56] References Cited

U.S. PATENT DOCUMENTS

| | | | |
|---|---|---|---|
| Re. 32,773 | 10/1988 | Goldwasser et al. | 364/419 |
| 4,339,806 | 7/1982 | Yoshida | 364/900 |
| 4,438,505 | 3/1984 | Yanagiuchi et al. | 364/900 |
| 4,459,049 | 7/1984 | Howell et al. | 400/98 |
| 4,559,598 | 12/1985 | Goldwasser et al. | 364/419 |
| 4,744,050 | 5/1988 | Hirosawa et al. | 364/900 |
| 4,760,528 | 7/1988 | Levin | 364/419 |
| 4,773,009 | 9/1988 | Kucera et al. | 364/419 |
| 4,777,596 | 10/1988 | Shaffer et al. | 364/300 |
| 4,893,238 | 1/1990 | Venema | 364/419 |
| 5,096,423 | 3/1992 | Goldwasser | 434/118 |
| 5,224,039 | 6/1993 | Cox et al. | 364/419 |
| 5,231,579 | 7/1993 | Tsuchiya et al. | 364/419 |

OTHER PUBLICATIONS

"Abbreviated Typing For Word Processing" by S. J. P. Todd, IBM Technical Disclosure Bulletin, vol. 21, No. 9 (Feb. 1979).

"Implementation and use of a computerized abbreviation directory" by Speth, D.J., Journal of Clinical Computing, vol. 12, No. 5, pp. 155–160 (1984).

"Abbreviations in medical texts. A challenge to computerized terminography" by Nedobity, W., Journal of Clinical Computing, vol. 13, No. 2–3 pp. 82–92 (1984).

*Primary Examiner*—Phu K. Nguyen
*Attorney, Agent, or Firm*—Skadden, Arps, Slate, Meagher & Flom

[57] ABSTRACT

A system for very fast entry of text into a computer. The system uses a current glossary, which may be custom generated to reflect common phrases and words pertaining to any specific subject matter, as a source for retrieving words and phrases from abbreviations. Text entry is input into the system through the entry of word abbreviations, phrase abbreviations and text entries. The system uses non-fixed abbreviations for words and phrases. A word abbreviation starts with the initial of the word and includes a subset of its other letters. A phrase abbreviation starts with the initials of its first word, or two words, and includes a subset of the initials of its other words. Words and phrases satisfying a specific abbreviation are displayed in advisory tables. A desired word or phrase may be selected using an expansion command. The expanded term is then entered into the system and thereby permits entry of lengthy phrases and words with minimal text entry. Finally, the systems proposes phrases that are likely continuations to the last entered words, allowing fast selection and input of such continuations.

22 Claims, 2 Drawing Sheets

5,623,406

METHOD AND SYSTEM FOR ENTERING TEXT IN COMPUTER EQUIPMENT

FIELD OF THE INVENTION

This invention relates to a method and system for rapid entry of text into computer equipment.

BACKGROUND

Text entry is the first step of most uses of computers and there will always be a need to enter text faster.

While many users of computers are familiar with keyboard operations, this cannot be assumed of the expanding new classes of users and this has created interest in alternative techniques for text entry, such as voice processing and handwriting recognition. But the problem of speed remains unresolved by these alternative techniques. Handwriting is slower than typing. A skilled typist can be expected to enter around 40 to 70 words per minute, but no voice recognition technique appears close to reaching it while this typing speed remains below the more than 100 words per minute of normal speech. Finally, the speed of speech is itself below the speed of reading—well beyond 200 words per minute—and we are known to recognize certain elements of text at far higher speeds, measured in thousands of words per minute.

So the limitations of the speed of text entry contribute to the frustration of users of computers when there may be more than a factor of ten between the time it takes to form an idea and keying it into a computer. Many high-level users therefore consider the use of computers as too slow and, in particular, as slowing down the thought process.

Several techniques have been tried in the past to accelerate text entry. These present techniques fall into the so-called categories of word-completion and macros.

Word-completion

Word-completion allows the user to type the initial letters of a word and let the computer system do the completion. A good example of word-completion was offered by the Spell key of the formula editor of a commercial spreadsheet called Javelin, released in 1984. When a Javelin user types a few letters and presses the Spell key, Javelin either completes the name or gives a list of possible names that match what was typed so far: If there is only one name that matches, completion is done automatically and the name is inserted; if two or more names match what was typed so far, Javelin displays a menu of possible choices. Selection of one of the menu choices is then done using cursors or a mouse, or by adding letters and pressing Spell again.

Similar word-completion techniques have been offered in many other commercial software products, such as word-processors and spelling checkers, for at least the past ten years. An early example was the spelling checker included with Microsoft Word, a word processor released around 1983.

The major drawback of word completion techniques comes from the fact that the root of a word (its first letters) is usually not a very good way to discriminate among several alternative words. For example, there are several hundred words starting with the root "con", and therefore any meaningful choice will require at least a fourth letter. Even with a fourth letter, there are more than a hundred words that start with "cont" or with "cons" and more than fifty that start with "const". So in practice, the root has to be sufficiently long to reduce the number of possible choices to ten or less, a number small enough to allow easy selection. Consequently, word completion fails to achieve a significant reduction in the number of keystrokes.

Several techniques have been proposed to overcome these limitations. For example, U.S. Pat. No. 4760528 offers a system of abbreviation based on the uses of abbreviated prefixes and suffixes. Similarly, U.S. Pat. No. 4893238 offers an abbreviation technique based on syllables. Neither these, nor other similar techniques based on strict abbreviation rules, have been very successful in practice. Both patents claim to achieve a reduction in the number of keystrokes entered that is in the range of 1.3 to 1.4. But most potential users consider this reduction to be insufficient to justify learning a set of strict abbreviation rule.

To achieve a higher reduction payoff requires other techniques and, in particular, it requires using abbreviations for phrases, not just for words, a domain addressed mostly with macros in the past.

Macros

Macros are an even older concept, first published in 1958 by Christopher Stratchey. With macros, a user can define abbreviations for certain (usually long) phrases or words, type the abbreviation and request its expansion with a special key. For example, the abbreviation "dj" may be defined for "Dow Jones Industrial Average" and then typing the two letters "dj" followed by the special key has the effect of expanding the abbreviation, that is, of replacing it by the corresponding text.

Commercial products offering this kind of macro capability appeared very early on microcomputers. Prokey, released in 1983, is an early example of such products. Similar macro capabilities were also incorporated in early versions of word-processors such as Microsoft Word (1983) and XyWrite. The names used for these facilities vary widely with the products and so do the special keys used for requesting expansion. Prokey allowed the user to select which key to use for expansion. A number of recent products use a single space as the key for expansion. For example, this is done in the Windows version of Microsoft Word (1994), with the so-called Autocorrect feature: having defined the abbreviation "asap", it may be expanded into "as soon as possible" when a space is typed after the final letter of "asap". A similar facility is offered in XyWrite and in WordPerfect version 6.1.

The above examples would suggest that macros have the potential to provide reduction factors higher than the 2 or 3 that is the minimum required to reach the speed of slow or moderate speech. But in practice the use of macros is severely limited by the difficulty of learning, remembering, and applying systematically such macros. So the facility tends to be used for a few favorite phrases—usually less than a hundred—, which means that its overall effect on input speed is only marginal. Both word-completion and macros fall short of offering a viable solution for fast text entry.

SUMMARY OF THE INVENTION

The object of the present invention is to facilitate and accelerate text entry using a conventional keyboard (or some variation, such as a pen computer) but without requiring professional keyboard skills. Furthermore, for those who are in the possession of such skills, this invention aims at accelerating text entry beyond usual speeds, possibly well beyond the speed of speech.

To achieve this kind of acceleration, the present invention allows a very easy use of powerful abbreviations that go far beyond the techniques used so far to accelerate text entry.

The present invention is a system for entering text in the form of phrases, words and characters into a computer. Prior to entering text, a subject specific current glossary comprising a plurality of subject specific phrases is selected for use by a computer as a reference file for word and phrase abbreviations. In a preferred embodiment of the present invention, a subject specific current glossary may be selected from a pre-existing series of glossaries or compiled from a pre-existing body of text.

Once the current glossary is selected, phrases within the current glossary may be entered into the computer by typing on a keyboard or other data entry device a sequence of characters including a first character and at least one other subsequent character. A set of matching phrases is then derived from the current glossary for display in an advisory table. The typed sequence of characters matches a glossary phrase if the typed sequence is the profile of a phrase obtained by dropping zero or more words from the glossary phrase, other than its first word or, in an alternative preferred embodiment, its first two words. The profile of a phrase is here understood to be the sequence of initials of the words of the phrase, after conversion to lower case and removal of any diacritical mark.

For example, "tbodotc" is the profile of the glossary phrase "The Board of Directors of the Corporation". So the sequence "tbc" matches the glossary phrase since "tbc" is the profile of the phrase "The Board Corporation" obtained by dropping the words "of the Directors of the". Similarly, the glossary phrase matches sequences such as "tbod", "TBDC", "tb", "Tb", and so on, as well as the unabridged profile "tbodotc".

The desired phrase may be selected from the set of matching phrases, which is displayed on a visual monitor, using a phrase selection command, also referred to as a marker. Consequently, a phrase is dynamically selected for entry into the computer using much less characters than that present in the phrase without the use of a predetermined abbreviation for the selected phrase.

In a preferred embodiment, the system is used to provide continuations of a previously selected phrase from the selected current glossary. A continuation of a previously selected phrase is defined to be a phrase that comprises at least one word and forms another phrase within the selected subject specific glossary when appended to the last two words of the previously selected phrase. A set of selected continuations may be displayed by the system and a desired continuation may be selected using a continuation selection command.

In a preferred embodiment of the present invention, glossaries also include pluralities of words and the system may be used to enter words through the use of abbreviated character entries. The system selects matching glossary words from the current glossary wherein each matching glossary word is such that the typed sequence of character can be obtained from the glossary word by dropping zero or more letters, other than the first letter, assuming a conversion to lower case and removal of any diacritical mark in both the glossary word and the typed sequence. (For example, the glossary word "Dichlorodifluoromethane" matches typed sequences such as "dcfm", "ddfmt", "didime", "Dh", and so on.)

The set of matching words is displayed by the system, and one of the matching words is selected using a word selection command.

In addition to the word abbreviations, phrase abbreviations and continuations, the glossaries of the present invention may also associate merit values to the phrases. The merit values may be used to order the set of matching phrases when they are displayed.

The present invention may also be provided with a glossary customization function. This function permits a user to create, combine and modify glossaries for different applications. This ensures that a glossary is truly representative of a specific subject matter and that it includes words and phrases which are likely to be referenced in the discussion of a specific subject.

BRIEF DESCRIPTION OF THE DRAWINGS

For a more complete understanding of the present invention, reference is made to the following Detailed Description taken in conjunction with the accompanying drawings in which.

DETAILED DESCRIPTION

Figure 2:
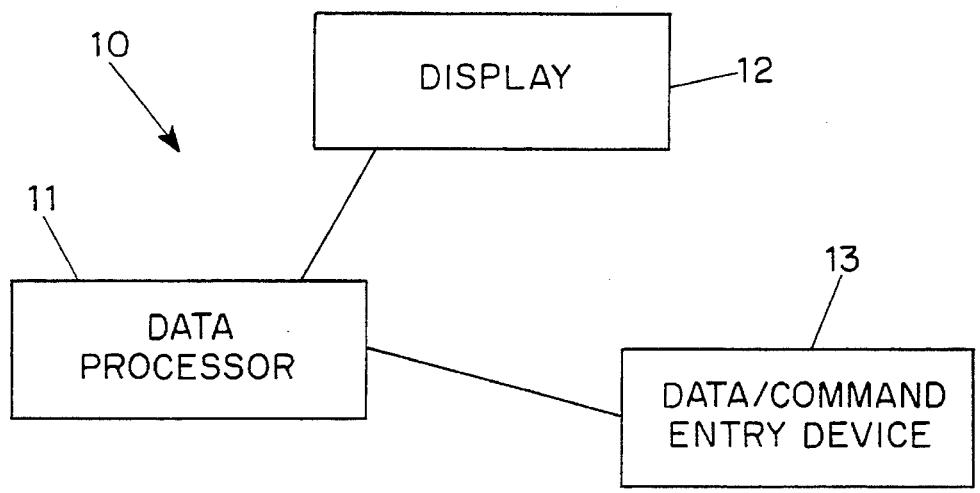
FIG. 2 is a block diagram of system components necessary to operate the preferred embodiment of the present invention.

The following is a description of a preferred embodiment of the present invention. The preferred embodiment of the data entry system is described and illustrated in context of a Microsoft Windows-based computer software program operated on a personal computer having a keyboard and a mouse. The invention however may be implemented on any data processing platform (see FIG. 2) having a video display (12), data processor and memory means (11) and a data/command entry device (13).

SYSTEM OVERVIEW

The text entry system of the present invention permits the entry of predefined subject specific words and phrases into the computer through input of only a few characters. As described in more detail below, subject specific words and phrases are stored in the computer in the form of a glossary. The glossary is a compilation of words and phrases. Multiple glossaries may be generated, modified and combined to provide a custom glossary which is tailored to the needs of a specific application.

Generally, the system operates in the following manner. A subject specific current glossary is initially selected for use by the system from the available glossaries in the system. Once the subject specific current glossary is selected, a sequence of characters is input into the system. The sequence of characters may represent a word, a word abbreviation or a phrase abbreviation. Because the present invention does not necessarily provide for word abbreviations and phrase abbreviations which are unique, multiple matching words and phrases are displayed by the system in the form of options in advisory tables upon entry of the sequence of characters into the system. The entered sequence of characters may then be expanded to produce a desired word or phrase as displayed on the advisory tables using a marker or other form of data entry command. If the sequence of characters represents the text to be entered into the computer, an appropriate text entry command may also be entered into the computer.

If the user has selected a phrase which is a subset of a longer phrase, a preferred embodiment of the system will also automatically display continuations of the selected phrase. Text entered through the system may be stored as an independent file or transferred to another application such as a word processor residing on the system.

The following is a more detailed description of the above described preferred embodiment of the present invention.

ABBREVIATIONS

Data Entry Interface

Figure 1A:
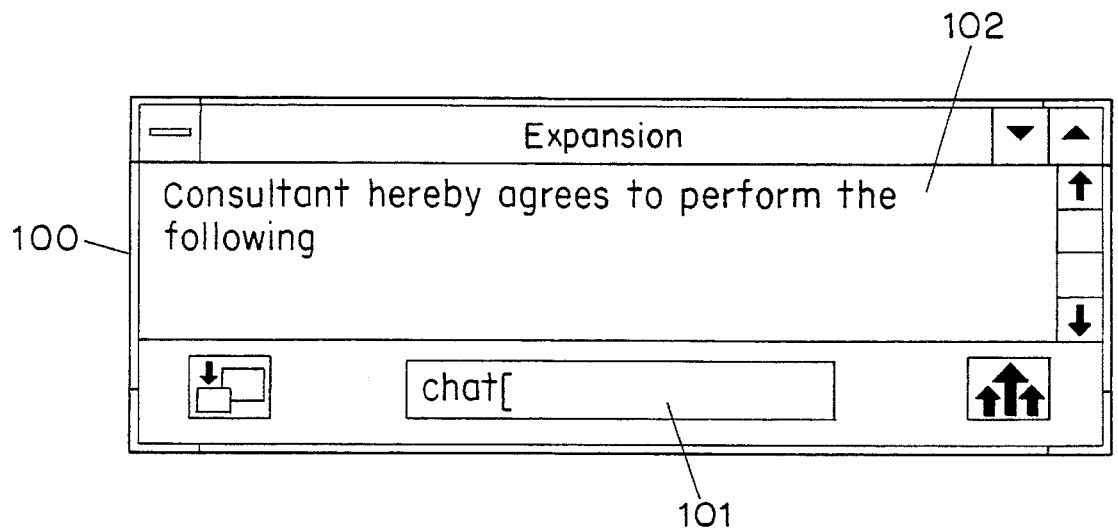
FIGS. 1A and 1B are illustrations of a display presenting the input and expansion facilities of a preferred embodiment of the present invention, including a phrase expansion command and a word expansion command.

Once a current glossary has been selected, the system is ready for entry of data in the form of abbreviations and standard text entry. In a preferred embodiment of the present invention, an input box (101), as illustrated in FIG. 1A, is displayed on a video terminal indicating characters input into the system by a user. The characters may be input in any number of ways as is well known to those skilled in the art, such as a keyboard and point and select devices.

Word Abbreviations

A word abbreviation under the present invention starts with the first letter of a word and includes one or more other letters of the word in the order in which they appear. For example, some possible abbreviations for the word "characteristics" appear below in the column labeled Short:

| Short | Words |
|-------|-------|
| chrtcs | characteristics |
| chat | characteristics |
| cttics | characteristics |
| chcs | characteristics |

As this example shows, the present invention does not limit abbreviations for specific words to a single unique entry. Rather it provides complete freedom in the choice of abbreviations and many possible forms: The first letter must be included (either as lower case or upper case) and the abbreviation must have at least one other letter; other than that, we may drop several letters of the word.

This provides the distinct advantage that a user does not have to remember a particular form and does not need to be consistent and always use the same abbreviation. The fact that a user does not have to memorize a given abbreviation for a given word is a significant improvement over previous facilities offered by word processors and other similar tools in the prior art.

Another example illustrates the kind of abbreviations that may be used for the word "Dichlorodifluoromethane":

| Short | Words |
|-------|-------|
| didime | Dichlorodifluoromethane |
| dcfm | Dichlorodifluoromethane |
| ddmh | Dichlorodifluoromethane |
| dh | Dichlorodifluoromethane |

The last sequence (dh) is likely to produce several possible choices. On the other hand, the three other sequences are very likely to be unambiguous and correspond to different styles of formulating abbreviations: they correspond to what a specialist of the domain might use with the knowledge of what is distinctive in the product. Each of them offers a reduction of the number of letters typed that is at least a factor of four. This example shows the superiority of the present invention over word-completion methods since, in a context of chemical products, there could be a large list of products whose name start by dichloro, or even by dichlorodifluoro, and close to half of the word would have to be typed before word-completion has a chance to work.

Phrase Abbreviations

In a preferred embodiment of the present invention, a phrase abbreviation includes the initial letters of some or all words of the phrase, starting with the initials of its first two words. For example, the following abbreviations can be used for the phrase "one of the" (one of the most frequent phrases of the English language):

| Short | Phrases |
|-------|---------|
| oot | one of the |
| oo | one of the |

Similarly, if the user is entering text relating to contracts, the following phrase may occur frequently and may be abbreviated as indicated in the column labeled Short:

| Short | Phrases |
|-------|---------|
| chf | Consultant hereby agrees to perform the following |
| chpf | Consultant hereby agrees to perform the following |
| chat | Consultant hereby agrees to perform the following |
| chatf | Consultant hereby agrees to perform the following |
| chatptf | Consultant hereby agrees to perform the following |

As in the case of word abbreviations, the present invention does not require that the user remember precise abbreviations. The only things that matters are that the first initial of the first word is included and that the initials included in the abbreviation are a subset of, and in the same order as, in the abbreviated phrase.

Markers

Under the examples described above, if a user typed "chat" the system can expand this to the word "characteristics", the phrase "Consultant hereby agrees ... ", or simply the word "chat". A user selects between these possibilities through the use of markers. A marker will instruct the system whether to expand the abbreviation to a word, phrase or not at all. For example, if the marker [ is predefined to be the phrase entry command, the entry of that marker after "chat" will instruct the system that what precedes is phrase abbreviation. This example is illustrated in FIG. 1A wherein entry of "chat [" in input box (101) has resulted in the entry within the expansion box (102) of the phrase "consultant hereby agrees to perform the following."

Figure 1B:
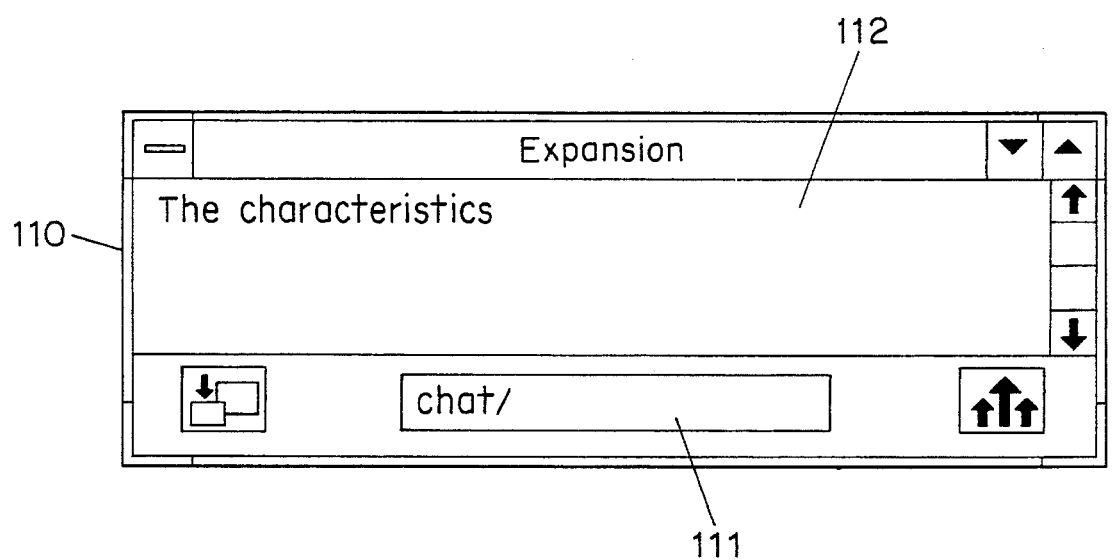

Similarly, in FIG. 1B the marker / is used as the word entry command. Entry of this command in input box (102) instructs the system that the words that precedes it is a word abbreviation and the word into "characteristics" is entered in expansion box (112). In expansion box (112) of FIG. 1B, the word "The" has been previously entered and the word "characteristics" is simply added thereafter with inclusion of a space.

Of course, if the word "chat" is to be entered into the system, a space after the word may serve as a text entry command and thus the system would function as usual in that the word "chat" would be entered into the expansion box. This example has used the single characters [ and / as markers but the system, in a preferred embodiment, permits the user to select other single characters as their own markers. Alternatively, a click with a pointing device, such as a mouse or a pen in a given area of the screen may serve the same purpose.

Glossaries

A glossary is a collection of phrases. A glossary may also include a collection of words. In a preferred embodiment of the invention, the phrases and words in the glossary all relate to a specific subject matter, i.e., they are words and phrases which are commonly used in the discussion of a specific subject.

A system will generally include multiple glossaries each of which is of interest to one of the system users. For instance, in a law firm there may be multiple lawyers who specialize in patent law, family law, and corporate law. Each group of lawyers would have their own glossary, or series of glossaries, which contain words and phrases which are commonly referenced in their specialty.

A user writing about a cross-section of subjects may also elect to load several glossaries for their specific application and switch between them instantaneously by means of a command or function key. Alternatively the user may opt to merge these glossaries. However, a merging of too many glossaries may negatively impact the usefulness of a particular system in that the system may overwhelm a user with too many options and result in wasted time spent reviewing the options in advisory tables (discussed further below).

Consider for example the abbreviation "fpt[". In the text of a contract, this could be an abbreviation for the phrase "from payments thereafter" whereas, in a technical document dealing with numerical operations, it could abbreviate the phrase "floating point type", or the phrase "for products that" in a text describing products. Clearly, if the system were to consider all possible domains of knowledge, the system would produce hundreds of phrases that abbreviate to "fpt[". Such a result would not be usable.

The automatic glossary compilation function of the present invention produces glossaries that correspond to different subjects and which do not exhibit the above-mentioned problem.

Glossary Compilation

The present invention provides a function which compiles glossaries for specific subjects by analyzing all words and phrases that appear in corresponding bodies of text. This process is referenced as glossary compilation and is automatically performed according to a Glossary Compilation Algorithm described further below. The process allows users to obtain glossaries that reflect the subjects on which they are writing, with their frequent terms and phrases. For example, a user may ask the system of the present invention to scan the files in a directory that contains contracts and to compile a corresponding "Contract" glossary. Similarly, the files of a directory of financial documents to produce a "Financial" glossary of frequent words and phrases in Financial texts.

Upon receipt of a glossary compilation command, the system requests the user to enter a unique name for the subject specific glossary to be compiled and to specify inclusion criteria for including a phrase or words appearing within the body of text in the subject specific glossary. The inclusion criteria may include minimum frequency values, which reflect the minimum number of times a word or phrase must appear in the body of text for inclusion into the glossary, and a maximum number of words in a phrase limitation, which limits the size of the phrase included in the subject specific glossary.

Once the inclusion criteria is specified (or permitted to be set at default values) and the body of text is identified, the system may analyze the body of text in order to identify words and phrases satisfying the stated criteria. The identified words and phrases are then stored in a file with the unique name previously identified by the user.

The above described compilation method permits any user to generate subject specific glossaries which truly reflect the user's writing style by including unique phrases and words commonly referenced by the user. Thus, the glossary will better predict words and phrases that will be entered in future works of the user.

The subject specific glossaries may also be modified to reflect unique words or phrases which are applicable to a specific user and have not been previously entered into the system.

For instance, if a patent attorney has previously written an application regarding a computer having a monitor, CPU and keyboard and subsequently wishes to enter text regarding the same computer with a modem attached, the user may enter common words and phrases relating to the modem into the pre-existing subject specific glossary. This may be completed in one of several methods. A user may elect to enrich an existing subject specific glossary named for Example "Computer" by selecting the "Computer" glossary as the current glossary. The user may then enter terms into the system not included in the current glossary and then run the enrich function of the present invention. Upon entry of the enrich function, the system will update the current glossary by reviewing the previously entered text and update the current glossary to include the newly entered words or phrases. The updated current glossary may then be saved as a new subject specific glossary or replace the previous subject specific glossary. The enrich program may be activated through a command such as a function key or as a separate sub-program run concurrently with the data entry program.

An alternative method for updating the existing subject specific glossary consists of merging the subject specific glossary with a new subject specific glossary compiled from a body of text including the words and phrases to be added to the subject specific glossary. The words and phrases would be compiled from the body of text would in the manner discussed below in order to identify those words and phrases satisfying the inclusion criteria. The new subject specific glossary would then be merged with the existing subject specific glossary to create a new updated subject specific glossary for use as the current glossary by the system.

Glossary Compilation Algorithm

The Glossary Compilation Algorithm analyzes the body of text to produce a subject specific glossary. It proceeds in four phases:

Phase 1: Scanning the body of text.

This phase scans the body of text and establishes an internal dictionary that includes all words encountered in the body of text. This scan also produces the frequency of each word in the body of text.

Phase 2: Rewriting the input body of text.

This Phase does a second pass over the body of text and eliminates all words whose frequency is below the word frequency limitation. This elimination is equivalent to replacing each eliminated word by a punctuation.

Phase 3: Generating Phrases

This phase does a pass over the text rewritten in phase 2 and isolates each source phrase, a source phrase being taken as the sequence of words between two punctuations.

Then it generates all the elementary phrases that are included in the source phrase and adds these elementary phrases to an internal dictionary of phrases. While doing the construction of this dictionary, the frequency of each elementary phrase is thereby measured.

As an example, assume that the source phrase is:

"Each chapter discusses a separate topic." Then each of the following elementary phrases will be counted once into the dictionary of phrases:

---

Each chapter discusses a separate topic
Each chapter discusses a separate
Each chapter discusses a
Each chapter discusses
Each chapter
    chapter discusses a separate topic
    chapter discusses a separate
    chapter discusses a
    chapter discusses
        discusses a separate topic
        discusses a separate
        discusses a
            a separate topic
            a separate
                separate topic

---

This means that if we get the separate source phrase

If a chapter discusses . . . Then the elementary phrase "chapter discusses" will be counted a second time for this other source phrase.

As these elementary phrases are generated, they are stored in an internal dictionary of phrases in which they are sorted according to their first two-letter group. Each two-letter group includes the phrases that have these two letters as initials of the first two words. For, example, the elementary phrase "chapter discusses a separate topic" will appear in the two-letter group "cd"; the phrases "chapter discusses" and "common definitions" also appear in the two-letter group "cd"; but the phrase "separate topic" appears in the two-letter group "st". Within a given two-letter group, phrases are sorted alphabetically at this stage.

Finally, the internal dictionary of phrases is pruned with the aim of retaining phrases of the highest merit, that is, those for which the use of an abbreviation results in the highest saving in keystrokes. First, are selected the phrases whose frequency is at least the word frequency limitation. Then the system retains phrases that do not necessarily meet this frequency criteria, but have sufficient letter density, where the letter density is defined as the number of characters divided by the number of words.

In the preferred embodiment of the present invention, a letter density of 6 is required for phrases of 2 words, 5 for 3 words, 4.5 for 4 words, and 4.3 for 5 words or more.

Phase 4: Generating the Glossary.

This phase starts with generation of the word section, which includes the words with a frequency higher than the word frequency limitation.

The generation of the phrase section is then started. This reviews each two-letter group with the aim of producing shorter, more usable groups. At the start of this phase, a typical group may look as follows (the frequency of each phrase is given between curly brackets):

---

| {77} | above named |
| {36} | above named Client |
| {36} | above named Client and |
| {12} | above named Client and Consultant |
| {12} | above named Client and Consultant hereby |
| {24} | above named Client and Contractor |
| {24} | above named Client and Contractor hereby |
| { 9} | above named Employee |
| { 8} | above named Employer |
| { 8} | above named Employer and |
| { 8} | above named Employer and the |
| { 8} | above named Employer and the above |
| {10} | are not |

---

If we assume a typical Advisory of 4 to 8 lines, this would not show all phrases and would miss all variations other than those including "Client". To achieve a reduction to something more usable and meaningful, the proper frequencies of each phrase is established by attributing to each phrase the frequency that corresponds to occurences as is, that is, excluding occurrences as part of a longer phrase. For the above example, this produces the following proper frequencies:

---

| {24} | above named |
| { 0} | above named Client |
| { 0} | above named Client and |
| { 0} | above named Client and Consultant |
| {12} | above named Client and Consultant hereby |
| { 0} | above named Client and Contractor |
| {12} | above named Client and Contractor hereby |
| { 9} | above named Employee |
| { 0} | above named Employer |
| { 0} | above named Employer and |
| { 0} | above named Employer and the |
| { 8} | above named Employer and the above |
| {10} | are not |

---

Then, for each phrase, a weight is calculated: it is the number of letters of the phrase less a certain bias (typically, a value of 5, to reduce very short phrases such as "are not") and multiplied by the proper frequency of the phrase. Such weights are calculated for all phrases that have a non-zero proper frequency. Then for phrases of 4 or 3 words, with a zero proper frequency, a weight is assigned that is the sum of the weights of the phrases in which it is included. For example, the proper frequency of the phrase "above named Client and" is zero but it is included in the phrase "above named Client and Consultant hereby" (of weight 360) and also in the phrase "above named Client and Contractor hereby" (of weight 720). Consequently, it is assigned the sum of these weights (that is, 1080).

Phrases are then sorted by weight and separated in two groups. The first group includes phrases of higher weight with one exception: if a zero proper frequency phrase is the first group, then enclosing phrases are put in the second group. Moreover, the size of the first group is limited to some predetermined small number such as 6 or 8. These groups are then output to the final glossary.

The effect of this separation is shown below for the above example:

---

| {24 120} | an | above named |
| {0 1080} | anca | above named Client and |
| {9 117} | ane | above named Employee |
| {0 192} | ane | above named Employer |
| {12 360} | ancach | above named Client and Consultant hereby |
| {24 720} | ancach | above named Client and Contractor hereby |
| {8 192} | aneata | above named Employer and the above |

---

This separation has achieved two things. First it has reduced the total number of phrases of the group (here from 13 down to 7). In addition, it has ordered them in such a way that we have a chance to consider all important phrases. Assume for example, that the user has limited the number of rows of the Phrase Advisory to 4. Then after typing the sequence of characters "an", the Phrase Advisory would display the following entries:

| Short | Extension |
|---|---|
| an | above named |
| anca | above named Client and |
| ane | above named Employee |
| ane | above named Employer |

After typing an additional "c" the Phrase Advisory would be updated as follows:

| Short | Extension |
|---|---|
| anca | above named Client and |
| ancach | above named Client and Consultant hereby |
| ancach | above named Client and Contractor hereby |

Alternatively, after typing an additional "e":

| Short | Extension |
|---|---|
| ane | above named Employee |
| ane | above named Employer |
| aneata | above named Employer and the above |

In each case, the number of lines is reduced to something small enough not to clutter the screen, thereby simplifying selection of the desired phrase.

In some case, the algorithm may produce second groups that are long. The corresponding phrases will only be used when additional characters are typed and also for continuations.

Glossary Formats

In a preferred embodiment of the present invention, each glossary is formatted to include a group of subject specific phrases and a group of subject specific words. As illustrated in Table 1 (a full Glossary relating to legal contract terms is attached as Appendix A hereto), words and phrases are grouped alphabetically and may include statistical data parameters enclosed within pre-established markers. In the sample provided below, curly brackets are used to mark values which indicate the frequency values and merit values as discussed above.

TABLE 1

[Words]

| { 308} | a | above |
|---|---|---|
| { 56} | a | accordance |
| { 130} | a | acknowledged |
| { 86} | a | Address |
| { 51} | a | advance |
| { 60} | a | against |
| { 39} | a | Agent |
| { 32} | a | agents |
| { 60} | a | agree |
| { 50} | a | agreed |
| { 789} | a | Agreement |
| { 71} | a | agreement |
| { 265} | a | agrees |
| { 80} | a | All |
| { 335} | a | all |
| { 41} | a | Amount |
| { 66} | a | amount |
| { 169} | a | an |
| {1993} | a | and |
| { 605} | a | any |
| { 44} | a | appropriate |

TABLE 1-continued

| | | * * * | |
|---|---|---|---|
| { 94} | w | without | |
| { 201} | w | work | |
| { 32} | w | workers' | |
| { 32} | w | writing | |
| { 93} | w | written | |
| { 84} | y | you | |
| { 79} | y | your | |

[Phrases]

| { 18 198} | aa | advance agreement |
|---|---|---|
| { 2 722} | aae | agents and employees |
| { 45 405} | aaf | agree as follows |
| { 23 161} | aa | Agreement and |
| { 0 483} | aaf | and agrees further |
| { 44 44} | aa | and all |
| { 21 189} | aa | and appropriate |
| { 24 696} | aaetcp | agents and employees to Client's person |
| { 21 483} | aaftea | and agrees further to execute all |
| { 4 24} | ab | Agreement by |
| { 0 1008} | abs | Agreement by sending |
| { 36 1008} | abswnt | Agreement by sending written notice to |
| { 22 462} | aci | All confidential information |
| { 22 176} | ac | and conditions |
| { 16 128} | ac | and Consultant |
| { 0 448} | act | and continue through |
| { 14 112} | ac | and Contractor |
| { 0 648} | acat | and Contractor and that |
| { 7 770} | ach | and Contractor hereby |
| { 18 270} | acwt | are consistent with the |
| { 0 696} | adnc | Agreement does not create |
| { 24 696} | adncae | Agreement does not create an employment |
| { 16 240} | adip | as defined in paragraph |
| { 0 840} | aer | an employment relationship |
| { 2 14} | ae | and employees |
| { 0 552} | aetc | and employees to Client's |
| { 18 288} | aewp | any extra work performed |
| | * * * | | |

The glossaries are preferably stored as text readable files so that they may be edited by any word processing program. This provides another way for users to customize specific glossaries to reflect their own preferences.

Advisories

Even within a given domain of knowledge, more than one phrase may correspond to a proposed abbreviation. To resolve such situations, the system lists the possible choices within a table called an Advisory. For example, using a contracts glossary, the letters "ic" will correspond to many possible phrases, and the possible choices will be reflected graphically in the Phrase Advisory. Table II represents the substantive contents of the Phrase Advisory. The phrase advisory may be displayed in any format appropriate for the system graphical capabilities.

TABLE II

| Short | Phrases |
|---|---|
| icir | if Contractor is required |
| icoticw | in consideration of the in connection with |
| icwt | in connection with the |
| icws | in connection with such |

As can be seen in the above example, the abbreviations are listed in the left column—under the label Short—and the corresponding expansions on the right—under the label Phrases. Should the user prefer the first choice (the italicized row), the entry may be selected by typing the marker [ or, by clicking or pointing to the row with a pointing device such as a mouse or a pen. Thus, the entry "ic[" is expanded by the system into "If Contractor is required".

If one of the later phrases is desired, the user may select the later entry by moving down the highlight with the arrow keys or the shift key (or by clicking with a mouse or pointing with a pen). Alternatively, one or more letters may be input to restrict the choice. Thus, if the additional letter "w" is input into the system, the advisory will be updated as follows:

| Short | Phrases |
|---|---|
| icw | in connection with |
| icws | in connection with such |
| icwt | in connection with the |
| icwpts | in connection with providing the services |
| icwtpo | in connection with the performance of | and after inputting an additional "p":

| Short | Phrases |
|---|---|
| icwpts | in connection with providing the services |

The system of the present invention provides similar help with the Word Advisory for word abbreviations. For example, assume the user knows nothing about word abbreviations and start typing "appropriately" in a normal fashion. After "app" the word advisory appears as follows:

| Short | Words |
|---|---|
| app | applicable |
| app | applied |
| app | appointment |
| app | appropriate |
| app | appropriately |

"Appropriately" appears at the bottom row and can be selected by pressing the control key or by adding another letter: inputting a "p" leads to the following:

| Short | Words |
|---|---|
| appp | appropriate |
| appp | appropriately | and, finally, typing a "y" leaves only one choice:

| Short | Words |
|---|---|
| apppy | appropriately |

Similarly, the same selection may be achieved by typing only "appy" or even (depending on the glossary) "apy". This ability to abbreviate words can save significantly for long words: five typed characters "appy/" are used instead of fourteen (the full word plus a space). This is most useful for subjects such as medical texts and other texts referring to products that have long complicated names. For example, typing the abbreviations "hcp/" or "hxcp/" for the word "Hexachlorocyclopentadiene" means that the user typed four or five letters instead of twenty-five.

It is preferred that the display of the glossary information in the advisories be instantaneous. This means that the preparation of information to be displayed has to happen in less than one fiftieth of a second on current (1995) microcomputers. To achieve this on many of today's computers, it is preferred that glossaries are loaded in the memory of the computer system, and pointers are kept to the start of entries that correspond to each of the 26 possible letters, both for phrase sections and for word sections.

Then, when the first two characters of a sequence of characters are entered, the glossary is searched for all phrases and for all words that match the two characters, starting at the first glossary entry that matches the first letter. All such entries are then stored into an internal phrase table and an internal word table. The first such entries are then displayed into the advisories. The number of entries displayed depends on the phrase display limitation command last entered and, similarly, on the word display limitation command last entered.

When an additional character is entered, each of the two internal tables is pruned so as to keep only entries that match the current sequence of characters. Each Advisory is then updated to reflect the contents of the corresponding internal table.

Finally when a marker or a space is entered, the current word or the current entry of the corresponding Advisory can be inserted into the expansion window.

It is at this stage that the Phrase Advisory is updated to reflect possible continuations. The treatment of continuations involves keeping a record of the last two words entered (hereafter called the "doublet"), whether these words were entered as normal words, by expansion of a phrase abbreviation, or by expansion of one or more word abbreviations.

Continuations

In an alternative embodiment of the present invention, a Continuations function is provided as another method for saving time in entering text. Once the user has input the beginning of a frequent phrase, the system will often be able to suggest its continuation. In the example that follows it is assumed that we are using the Contract glossary included in Appendix A. After typing "ico", the Phrase Advisory appears as follows:

| Short | Phrases |
|---|---|
| ico | In consideration of |
| icot | In consideration of the |
| icotm | In consideration of the mutual |
| icotmc | In consideration of the mutual covenants |

If the highlighted phrase "In consideration of" is selected by a user by typing the marker [, a new list of phrases will appear in the Phrase Advisory:

| Short | Phrases |
|---|---|
| tm | the mutual |
| tmc | the mutual covenants |
| tmcc | the mutual covenants contained |

The advisory contains the most likely continuations for the phrase "In consideration of". So we select again the first phrase by typing the marker [ (or by clicking with a mouse or pointing with a pen) and the advisory now contains continuations for "In consideration of the mutual":

| Short | Phrases |
|---|---|
| cc | covenants contained |
| cch | covenants contained herein |
| cchaog | covenants contained herein and other good | and likewise, after selecting the first row, another list of possible phrases will appear:

| Short | Phrases |
|---|---|
| ha | herein and other |
| haogav | herein and other good and valuable | followed by another:

| Short | Phrases |
|---|---|
| ga | good and |
| gavc | good and valuable consideration |
| oe | out-of-pocket expenses |
| oeib | out-of-pocket expenses incurred by | and finally:

| Short | Phrases |
|---|---|
| vc | valuable consideration |

Figure 3:
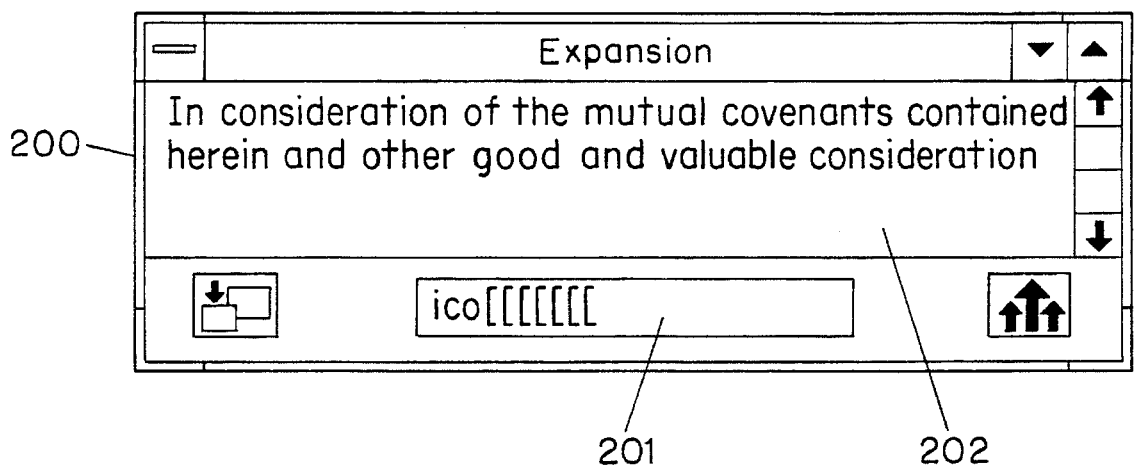
FIG. 3 is an illustration of an expansion box and input box of a preferred embodiment of the present invention employing the continuation commands and function of the present invention.

To summarize, by entering "ico[[[[[[" the phrase "In consideration of the mutual covenants and other good and valuable consideration" was entered into the system. A graphical representation of how the function would appear is illustrated in FIG. 3. This did not require the user to remember any abbreviation and the choices were made step by step at electronic speeds.

The determination of continuations is done as follows:

For a doublet that results from the expansion of a phrase abbreviation into a phrase, consider all phrases that (1) belong to the same two-letter group as that phrase in the phrase section of the current glossary and (2) include the doublet. Then each phrase that consists of trailing words after the doublet in one of these phrases is inserted in the internal phrase table, unless it is already there.

In addition (and whatever the origin of the doublet), the phrase section of the current glossary is searched for all phrases that start with the doublet.
Then each phrase that consists of trailing words after the doublet in one of these phrases is inserted in the internal phrase table, unless it is already there.

Finally, the phrases of the internal phrase table are displayed in the Phrase Advisory as explained before.

For example, assume that we have the following two-letter group in the phrase section of a glossary:

| | |
|---|---|
| an | above named |
| anca | above named Client and |
| ane | above named Employee |
| ane | above named Employer |
| ancach | above named Client and Consultant hereby |
| ancach | above named Client and Contractor hereby |
| aneata | above named Employer and the above |

Assume further that the phrase "above named Client and" is entered by expansion of the phrase abbreviation "anca[". Then the doublet "Client and" is included in two of the entries of this "an" two-letter group so that the corresponding trailing phrases are entered in the internal phrase table:

Consultant hereby Contractor hereby

Then the phrase section of the glossary is searched for phrases that start with the doublet. For example, assume the following appear:

| | |
|---|---|
| cachaa | Client and Consultant hereby agree as |
| cachaa | Client and Contractor hereby agree as |

The additional continuations are then included in the internal table:

Consultant hereby agree as Contractor hereby agree as

The following continuations are therefore displayed for this example:

| |
|---|
| Consultant hereby |
| Contractor hereby |
| Consultant hereby agree as |
| Contractor hereby agree as |

The present invention permits a user to compile glossaries for each of the different subjects for which the user normally has texts. The user may already have directories that correspond to different subjects (for example, a directory for contracts, one for sales, one for administrative, another for windsurfing. . . ). So compiling a glossary for each such directory may be an easy step. In other cases, the user will want the system to compile a glossary for a complete set of texts that have a common subject. These may be texts that are produced in-house or texts that may be obtained from a data base, an electronic bulletin board, or an CD-Rom. In general, glossaries that are customized to the user's practice will tend to be more effective.

Once a subject specific glossary is compiled, the glossary is selected. The user will then commence typing in the input box (201) of FIG. 3. As the user types, the advisories, which are preferably displayed near the expansion box and for which there is a separate advisory for words and phrases, will show the user what abbreviations are available: This means that the user does not need to remember specific abbreviations. When the user types an abbreviation and enters an expansion command, the abbreviation will be expanded in the expansion window: Of course, any normal word (that is, other than an abbreviation) is sent as is to the expansion window. If the subject of the user's document changes, the user can switch instantaneously to another glossary of the list of active glossaries.

In one embodiment of the present invention, the system is used as a stand-alone editor. If a user is recording minutes of a meeting, the present invention may be provided with a tape facility which records all entries input into the input box prior to their expansion. This permits the user to double-check what was typed and what occurred during expansion.

In another embodiment of the present invention, the system is used in conjunction with a Word Processor. In such a case, the user will use the system mainly for its abbreviation expansion ability while other editing and formatting functions will be done with the word processor. In this alternative embodiment, the system is provided with a transfer function which will transfer entered text from the system into the word processor. This can be done manually—by a menu command which transfers all entered text present in the expansion box of the system of the present invention into the word processor. Alternatively, the system may be provided with an automatic transfer function which transfers the expansion text automatically at the end of each paragraph. This may be provided by having the transfer function automatically occur at the entry of a carriage return.

Many possible modifications are possible to the above referenced embodiments of the present invention without straying from the spirit of the invention. For instance, the advisories may be modified to include a limited number of entries or to display words and phrases according to merit values associated with the corresponding words or phrases. Alternatively, the system may be modified to include the function of automatically capitalizing the first words in a sentence when the word or phrase is entered into the computer.

What is claimed is:

1. A method for rapid entry of text into a computer, said text comprising a plurality of phrases, words and characters, each of said words including an initial corresponding to a first character in the word, said method comprising:

selecting a subject specific current glossary comprising a plurality of subject specific phrases for use by the computer;

entering a sequence of characters including a first character and at least one other subsequent character in the computer;

selecting a set of matching phrases from the current glossary by the computer wherein each said matching phrases includes a sequence of words such that
  (i) the initial of a first word in said sequence of words matches the first character of the entered sequence of characters,
  (ii) the entered sequence of characters is a subset of a set of characters that match the initials of the words in the sequence of words, and
  (iii) the entered sequence of characters are in the same order as the initials of the matching words in the matching phrase;

displaying the set of matching phrases; and selecting one of said phrases in the displayed set of matching phrases using a phrase selection command for use by the computer, whereby a phrase is dynamically selected for use by the computer using less characters than that present in the phrase without the use of a predetermined abbreviation for the selected phrase.

2. The method of claim 1, wherein said method further comprises: selecting from the selected current glossary a set of continuations of the selected one of said displayed phrases wherein (i) each of the selected continuations is a phrase comprising at least one word, and (ii) forms another phrase within the selected subject specific glossary when added to the last two words of the selected phrase;

displaying the set of selected continuations; and selecting one of the displayed continuations using a continuation selection command for use by the computer, whereby a continuation of the selected phrase is dynamically selected for use by the computer using a number of characters having less characters than that present in the selected continuation without the use of a predetermined abbreviation for the selected continuation.

3. The method of claim 2, wherein the subject specific glossary further comprises a plurality of words and said method further comprises:

selecting a set of matching words from the current glossary by the computer wherein each said matching words is such that
  (i) the initial of the matching word matches the first character of the entered sequence of characters,
  (ii) the entered sequence of characters is a subset of a set of characters that match the characters in said matching word, and (iii) the entered sequence of characters is in the same order as the matching characters in the matching word;

displaying the set of matching words; and selecting one of said matching words using a word selection command, whereby a word is dynamically selected for use by the computer using less characters than that present in the word without the use of a predetermined abbreviation for the selected word.

4. The method of claim 3 wherein characters match if they differ at most by a case or by a diacritical mark.

5. The method of claim 4, wherein the phrase selection command and the continuation selection command are the same command.

6. The method of claim 3 wherein the computer is a point and select system including a display and a corresponding mouse or pen pointing device and the selection of one of said displayed phrases and words is performed on the display with the pointing device.

7. The method of claim 3 wherein said computer includes a word processing program and said method further comprises:

storing a selected text comprising a plurality of said selected phrases, selected continuations and selected words for use by the computer;

forwarding the selected text to a word processing program upon entry of a text forwarding command; and storing said selected text for use by the word processing program in the computer.

8. The method of claim 7, wherein the text forwarding command is a carriage return.

9. The method of claim 3 wherein said method further comprises entering a phrase display limitation command including a number of phrases to be displayed whereby the display of the set of selected phrases is limited to the entered number of items, and a word display limitation command including a number of words to be displayed whereby the display of the set of selected words is limited to the entered number of items.

10. The method of claim 9 wherein said display limitation command further comprises a minimum length value whereby words from the set of selected words having more than a specified number of characters will be displayed.

11. The method of claim 3 wherein each of said plurality of characters includes a corresponding phrase or word and said method further comprises entering one of said plurality of characters into the computer, displaying the corresponding phrase or word by the computer, and entry of the phrase selection entry command whereby the single corresponding phrase or word is entered as text into the computer.

12. The method of claim 1, wherein said method further comprises the step of compiling a subject specific glossary with the computer from an existing body of text comprising at least one computer readable file for use as the subject specific current glossary, wherein the compiling of the subject specific glossary comprises:

selecting the body of text for processing by the computer;

entering into the computer a phrase inclusion criteria for including a phrase within the body of text in the subject specific glossary, said phrase inclusion criteria including a minimum number of times a phrase must appear in the body of text for inclusion in the subject specific glossary;

analyzing the body of text by the computer for selection of phrases that satisfy the phrase inclusion criteria; and storing each of the selected phrases into the subject specific glossary.

13. The method of claim 12 wherein said phrase inclusion criteria for including a phrase within the body of text in the subject specific glossary further includes a minimum word frequency limitation and a maximum number of words in the phrase limitation.

14. The method of claim 13 wherein said phrase inclusion criteria for including a phrase within the body of text in the subject specific glossary further includes a merit value for each selected phrase, said merit value being proportional to the number of times the selected phrase is found in the body of text times the number of characters in the selected phrase, and said step of displaying the set of matching phrases further comprises ordering the set of matching phrases according to the merit value associated with each of the matching phrases in said set of matching phrases for display by the computer, whereby the phrase inclusion criteria for including a phrase favors inclusion into the subject specific glossary of long phrases for which use of an abbreviation amounts to entering much less characters than that present in the phrase.

15. The method of claim 12, wherein said method further comprises:

entering into the computer a word inclusion criteria for including a word within the body of text in the subject specific glossary, said word inclusion criteria including a minimum number of times a word must appear in the body of text for inclusion in the subject specific glossary;

analyzing the body of text by the computer for selection of words that satisfy the word inclusion criteria; and storing each of the selected words into the subject specific glossary.

16. The method of claim 15 wherein said word inclusion criteria for including a word within the body of text in the subject specific glossary further includes a merit value for each selected word, said merit value being proportional to the number of times the selected word is found in the body of text times the number of characters in the selected word, and said step of displaying the set of matching words further comprises ordering the set of matching words according to the merit value associated with each of the matching words in said set of matching words for display by the computer, whereby the word inclusion criteria for including a word favors display of matching words that are long even if less frequent in the body of text.

17. The method of claim 16 further comprising:

compiling a plurality of subject specific glossaries;

attaching a unique name to each compiled subject specific glossary; and storing each uniquely named subject specific glossary into the computer, whereby a plurality of subject specific glossaries are stored into the computer.

18. The method of claim 17 further comprising:

selecting two or more of the plurality of subject specific glossaries stored into the computer;

combining the selected two or more subject specific glossaries into a new subject specific glossary;

attaching a unique name to the new subject specific glossary and storing the new subject specific glossary on the computer.

19. The method of claim 18 further comprising:

producing a temporary subject specific glossary by compiling a set of phrases entered into the computer as text;

forming a merged subject specific glossary by combining the temporary glossary with the current subject specific glossary; and using the merged subject specific glossary as the current subject specific glossary for selection of matching phrases and matching words, whereby a method is offered for automatically updating the subject specific current glossary to include phrases and words recently entered into the computer as text.

20. The method of claim 19 wherein the compiled subject specific glossary is stored on the computer in the form of a text file and includes one or more phrase sections and word sections wherein each of said phrase sections comprises a phrase heading enclosed in a pair of square brackets and at least one phrase entry, each of said word sections comprises a word heading enclosed in a pair of square brackets and at least one word entry, and each of said phrase entries being on a single line and comprising an optional phrase comment enclosed by a pair of curly brackets, a sequence of letters, and a phrase, and each of said word entries being on a single line and comprising an optional word comment enclosed by a pair of curly brackets, a single letter, and a word, whereby the text file is stored in a format that allows modification of the entries of a glossary by conventional means such as a word processor.

21. The method of claim 15 wherein the minimum number of characters limitation equals one.

22. The method of claim 1, wherein each of said matching phrases further includes a sequence of words such that the initial of the second word in said sequence of words matches the second character of the entered sequence of characters.

* * * * *